(No Model.) 2 Sheets—Sheet 1.

W. G. HOWELL.
HOLLOW SHAFTING.

No. 425,324. Patented Apr. 8, 1890.

Witnesses:
E. P. Ellis,
J. M. Nesbit.

Inventor:
Wm. G. Howell,
per F. A. Lehmann,
atty.

(No Model.) 2 Sheets—Sheet 2.

W. G. HOWELL.
HOLLOW SHAFTING.

No. 425,324. Patented Apr. 8, 1890.

Witnesses:
E. P. Ellis
A. Stevens Pattison

Inventor:
W. G. Howell,
per F. A. Lehmann,
Atty

UNITED STATES PATENT OFFICE.

WILLIAM G. HOWELL, OF PHILADELPHIA, PENNSYLVANIA.

HOLLOW SHAFTING.

SPECIFICATION forming part of Letters Patent No. 425,324, dated April 8, 1890.

Application filed August 20, 1889. Serial No. 321,371. (No model.)

*To all whom it may concern:*

Be it known that I, WILLIAM G. HOWELL, of Philadelphia, in the county of Philadelphia and State of Pennsylvania, have invented certain new and useful Improvements in Hollow Shaftings; and I do hereby declare the following to be a full, clear, and exact description of the invention, such as will enable others skilled in the art to which it pertains to make and use it, reference being had to the accompanying drawings, which form part of this specification.

My invention relates to an improvement in hollow shafting; and it consists in, first, a hollow shaft having internal flanges or ribs of any suitable width for the purpose of bracing, strengthening, and forming a sufficient thickness through the shaft to allow the key ways or grooves to be cut therein without materially weakening the shaft; second, the combination of two sections of pipes having internal ribs or flanges with a suitable conical coupling, which is placed in the ends of the pipes and fastened in position by means of a set-screw or other fastening devices; third, the combination of two sections of a hollow shaft, a suitable coupling which is placed inside of their ends and which is made in two or more parts, and a suitable fastening device for securing the coupling to the ends of the section of the shaft, as will be more fully described hereinafter.

The objects of my invention are to produce a hollow shaft which has its sections connected together by an internal coupling, so that the shaft will produce an unbroken surface from end to end, and to provide a shaft which is lighter, cheaper, and equally as serviceable as the solid shafting now in use.

Figure 1:
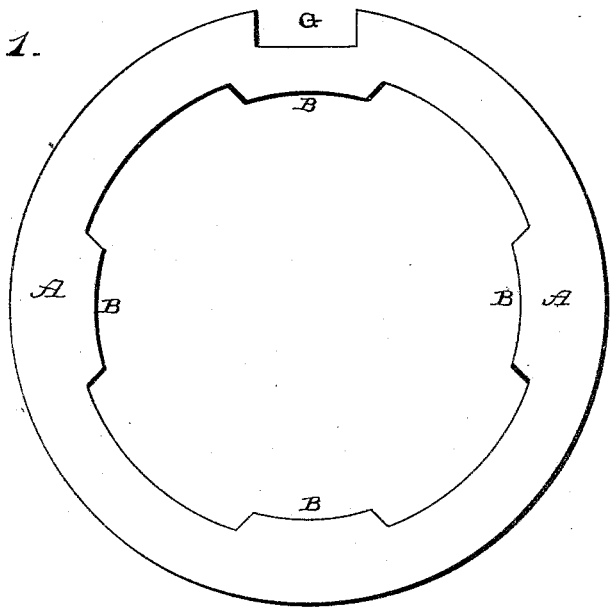
Figure 2:
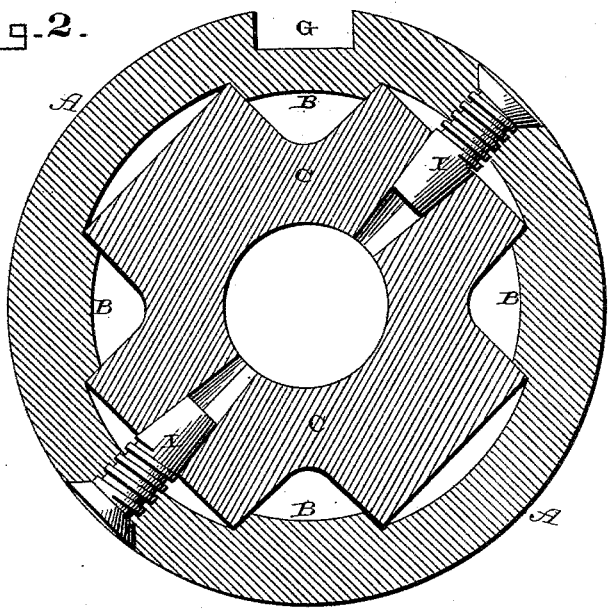
Figure 3:
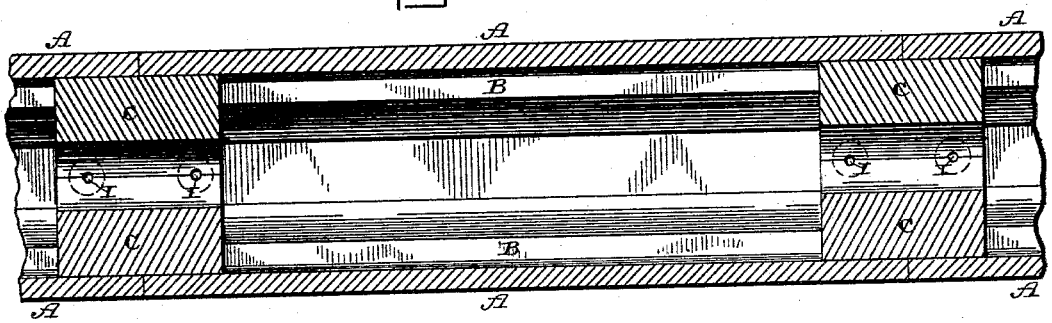
Figure 4:
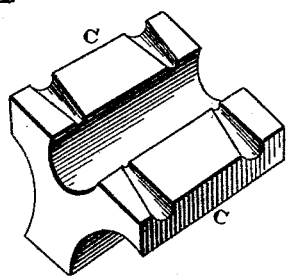

Figure 1 is an end view of a hollow shaft which embodies my invention. Fig. 2 is a vertical section taken through the coupling. Fig. 3 is a longitudinal section of the coupling and two sections of shaft united thereby. Fig. 4 is a perspective of one-half of one of the couplings.

A represents a hollow shaft, which will be made in sections which are to be united together, and which has formed upon its inner surface a number of ribs, flanges, or thickened portions B, which extend from one end of the shaft to the other. These flanges or ribs serve to brace and strengthen the shaft and to make it more rigid while in operation than it would be were the shaft made of the same thickness from end to end in the usual manner. These thickened portions also serve to allow a key way or groove G to be cut in the outer surface of the shaft without weakening it to any material degree. If the shaft were the same thickness throughout, the keyway would extend nearly through the shaft, or else the shaft would have to be made much heavier and thicker than is necessary. These ribs or flanges also serve as a means for holding rigidly in position the internal couplings C, which are used to connect the sections of the shaft together. These couplings being internal, the shaft presents an even surface from one end to the other, thus allowing pulleys or wheels of any kind to be attached to them at any desired point. The couplings C are preferably of the form shown in Fig. 2, and, while each coupling may be made in only a single piece, I prefer to make each one of two separate and distinct pieces, as shown. The corners of the coupling catch between the ribs or flanges, as shown, and are thus prevented from turning, slipping, or becoming displaced in the shaft to the slightest degree. Passed through the end of each section of the shaft into the coupling which unites two of the sections together is a set-screw I, which is made conical at its inner end, and this conical end catches between the two parts of the coupling and forces them apart, so as to compel them to take a stronger hold upon the sections of the shaft than they otherwise would do. As shown, the outer ends of these screws are raised in the outer sides of the shaft, so as to offer no obstruction to the movement of the pulley or wheel placed upon the shaft. That portion of the coupling where the set-screws catch in them may be slotted or grooved or formed in any other way that may be preferred. Either a single set-screw may be used, which will enter the coupling from one side, or two screws may be passed through each end of each section of the shaft, as may be preferred.

Having thus described my invention, I claim—

1. The combination of two or more sections of hollow shafting having internal ribs or flanges which extend longitudinally through the shafting, with internal couplings secured inside of the ends of the sections, substantially as shown.

2. The combination of a hollow shaft having internal ribs or flanges with internal angular couplings which fit in the ends of the sections of the shaft, and the set-screws or fastening devices which are passed through the shaft from its outer side into the coupling, substantially as described.

3. The combination of a hollow shaft with internal couplings which are formed of two parts and conical set-screws for forcing the parts of the coupling against the inner sides of the ends of the hollow shaft, substantially as set forth.

4. A hollow shafting provided with internal longitudinal strengthening ribs or flanges, substantially as shown.

5. A hollow shafting provided with a longitudinal groove in its exterior surface and with internal longitudinal strengthening ribs or flanges, substantially as specified.

In testimony whereof I affix my signature in presence of two witnesses.

WILLIAM G. HOWELL.

Witnesses:
WARREN C. STONE,
F. A. LEHMANN.